United States Patent [19]

Moline

[11] 4,046,920

[45] Sept. 6, 1977

[54] METHOD FOR FORMING DOUGH SHELLS

[75] Inventor: Roy V. Moline, Duluth, Minn.

[73] Assignee: Jeno's, Inc., Duluth, Minn.

[21] Appl. No.: 552,842

[22] Filed: Feb. 25, 1975

Related U.S. Application Data

[62] Division of Ser. No. 167,405, July 29, 1971, Pat. No. 3,880,069.

[51] Int. Cl.² ............................................. A21D 8/02
[52] U.S. Cl. ..................................... 426/19; 426/391; 426/502
[58] Field of Search ................ 426/27, 19, 390, 391, 426/502, 503, 504, 518, 496

[56] References Cited

U.S. PATENT DOCUMENTS

| | | | |
|---|---|---|---|
| 1,883,592 | 10/1932 | Crosland | 426/502 |
| 2,253,770 | 8/1941 | Duffy, Jr. | 426/27 |
| 2,905,559 | 9/1959 | Anderson et al. | 426/502 X |
| 3,146,730 | 9/1964 | White | 426/496 X |
| 3,198,142 | 8/1965 | Lothes | 426/19 |
| 3,503,343 | 3/1970 | Jackel | 426/27 |
| 3,690,895 | 9/1972 | Amadon et al. | 426/502 X |

Primary Examiner—Frank W. Lutter
Assistant Examiner—William A. Cuchlinski
Attorney, Agent, or Firm—Daniel J. Meaney, Jr.

[57] ABSTRACT

A method for forming dough shells in a continuously transported web of dough using the steps of proofing the moving dough web, forming the proofed dough web into dough shells, resting the dough shells and reclaiming and blending the trimmings of the dough web into the dough is also shown.

8 Claims, 12 Drawing Figures

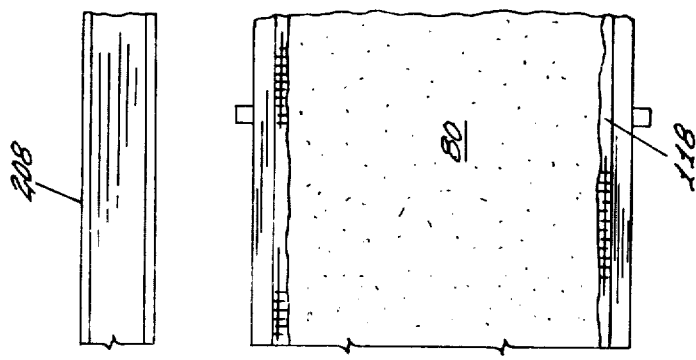
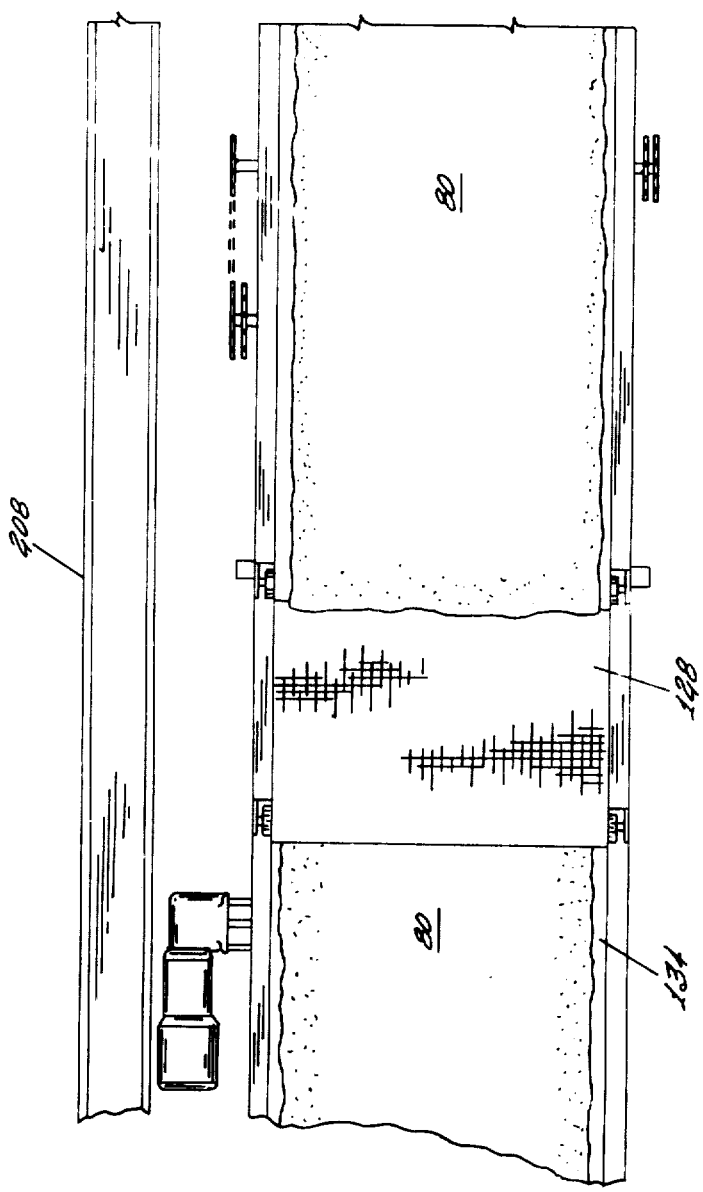
Fig 5

METHOD FOR FORMING DOUGH SHELLS

This is a division of application Ser. No. 167,405, filed July 29, 1971 now U.S. Pat. No. 3,880,069.

BACKGROUND OF THE INVENTION a. Field of the Invention

This invention relates to apparatus and methods for forming or cutting dough shells or dough sections, such as for example pizza pie shells, from a sheeted web of dough. This invention has application to the fields of dough handling machines and apparatus and apparatus and devices for forming dough products. One particular field of use is in proofing apparatus for dough products. Other related fields include dough reclaiming apparatus with particular emphasis on apparatus and methods for reclaiming and using dough scraps or trimmings.

The present invention relates to apparatus and method for forming dough shells, for example pizza shells, on a continuous basis, wherein a sheeted dough is transported through a proofing stage and the proofed dough web is sheeted to a predetermined thickness and width whereupon the dough shells are cut from or formed in the dough web and the formed dough shells are separated from the balance of the dough web trimmings. The dough shells are transported to a resting stage while the trimmings are processed and blended back into the raw dough utilized for the sheeted dough web thereby reducing the loss of dough while producing dough shells on a continuously moving conveyor line.

Also inventions are disclosed covering other subject matters such as the combination of a proofing, forming and resting apparatus and apparatus for transferring dough shells from an endless belt conveyor to a conveyor comprised of pivotly mounted tray pans.

b. Description of the Prior Art

It is known in the prior art to use dough forming apparatus for forming dough products from a sheet or web of dough. One known type of apparatus described in U.S. Pat. No. 2,954,693 utilizes a feed hopper having an extrusion slot or nozzle to form a sheet of dough, which sheet is deposited onto a bake pan unit. The bake pan unit, which comprises a set of four flat round pans having knife-like peripheral edges, are transported, together with the sheeted dough, by an endless belt conveyor formed of the bake pan unit into releasable pressure contact with a pivotly mounted roller. The roller cooperates with the knife-like edges to cut the dough. The excess dough, the trimmings, are conveyed back to a hopper where it is collected and returned to the feed hopper.

Another known dough forming apparatus for dividing a sheet or web of dough into dough sections, and disclosed in U.S. Pat. No. 1,945,755, utilizes a plurality of rollers to form a body of dough into a sheet, which sheet is deposited on a moving endless belt conveyor. The dough sheet is successively punctured, after sheeting, to evacuate air therefrom. The dough sheet is then divided into dough sections by means of a rotary cutter which releaseability maintains the dough scraps between the cutting edges. Spring-pressed ejectors automatically strip the scraps from the cutters as the divided dough sheet leaves the cutter.

Another portion of the prior art, which is applicable to the proofing aspect of the present invention, is disclosed in U.S. Pat. No. 1,938,294. This patent broadly teaches use of a continuous tray conveyor wherein molded loaves of dough positioned on the tray, or pan formed by the tray, are passed continuously through first a proofing stage and then a baking oven.

A method and means for preparing dough pieces on a continuous basis utilizing a step of intermediate proofing is disclosed in U.S. Pat. No. 3,198,142. In this method, the mixed dough, in a mass, is conveyed in a relatively slow continuous manner until the mass of dough reaches a stage of proper development where the dough mass is then divided into dough pieces. The method provides for returning and re-fermentating some of the mixed dough for remixing with the dough proceeding from the mixer.

SUMMARY OF THE INVENTION

The apparatus and method for forming dough shells of the present invention have several unique features and advantages over the known prior art systems and method. One such unique feature is that the sheet or web of dough is proofed prior to cutting, the proofed dough web is divided, the cut dough shells are proofed a second time prior to baking, and the dough trimmings are reclaimed. All of the above steps occur on a continuing basis.

Another unique feature of the present invention is use of a separating means to continuously remove scraps or trimmings as the dough web is cut, thereby enabling the dough sections or dough shells and the trimmings to be simultaneously processed separately.

The present invention also teaches a method and means for continuously reclaiming dough trimmmings and blending the same back into the mixed dough.

The prior art does not disclose nor suggest the method and apparatus of the present invention. For example, the prior art method and apparatus utilizing a bake pan unit for forming the dough shells requires a specially fabricated conveyor incorporating such bake pan units for form the dough shells. Absolutely no proofing is suggested or disclosed. Further, the reclaimed scraps are merely dumped into a hopper, which hopper when filled, is merely dumped and not blended into a feed hopper where the trimmings are indiscriminately mixed with a new dough. The dough web width, thickness and other properties which are important to a high quality dough product, are uncontrolled.

Some of the known methods and processes for forming dough products teach use of a single proofing stage. One such method touches on the recycling of a portion of dough mass, prior to dividing and only after a single intermediate proofing step, into the mixed dough to enhance the quality thereof.

Several major problems are associated with the known prior art methods and apparatus for forming pizza pie shells on a continuous basis. One problem is that the physical properties and characteristics of the final dough product, such as for example tenderness of the crust, baking qualities, machinability, are very poor. Another problem has been reclaiming of the trimmings on a continuous basis. For some specific dough shell geometrys, the quantity of dough trimming produced from cutting the dough web approach 33%. The known prior art methods for collecting the trimming in one hopper and dumping the collected trimmings into a second hopper with mixed dough yield a mixed dough varying in proportions of new mixed dough and recycled dough trimmings.

A historical production problem with dough products produced from a sheeted or web of dough has been uniformity. This includes not only texture of dough and the like, but consistency in having the dough shells of desired geometrical shapes, for example pizza crusts with uniform diameter and thickness.

The present invention overcomes the problems and disadvantages of the prior art while yielding an efficient method and apparatus for producing high quality dough shells. One advantage of the present invention is that the dough web and dough shells cut therefrom are proofed separately on a continuous basis.

Yet another advantage of the present invention is that dough trimmings can be reclaimed and controllably blended with newly mixed dough.

A further advantage of the present invention is that the dough shells yield a dough product which is tender, of good baking characteristics, of uniform physical qualtites and controllably of the same dough characteristics after the double proofing.

Other important advantages include means and apparatus adapted to continuously transfer cut dough shells from an endless web to a moving tray conveyor.

The apparatus of the present invention permits controllably working the dough web into desired thickness and width and cutting dough shells therefrom on a continuous basis.

The method of the present invention teaches proofing of a dough web formed of both mixed dough and reclaimed dough trimmings, sheeting the same into a desired width and thickness, cutting dough shells therefrom, proofing the dough shells and reclaiming and blending the dough trimming into the dough prior to formation of the dough web.

BRIEF DESCRIPTION OF THE DRAWING

The above advantage and other advantages will become readily apparent when considered in light of the preferred embodiment described herein taken together with the following drawing wherein:

FIG. 5 is a top view of the proofing compartment of FIG. 4;

DESCRIPTION OF THE PREFERRED EMBODIMENT(S)

Figure 1:
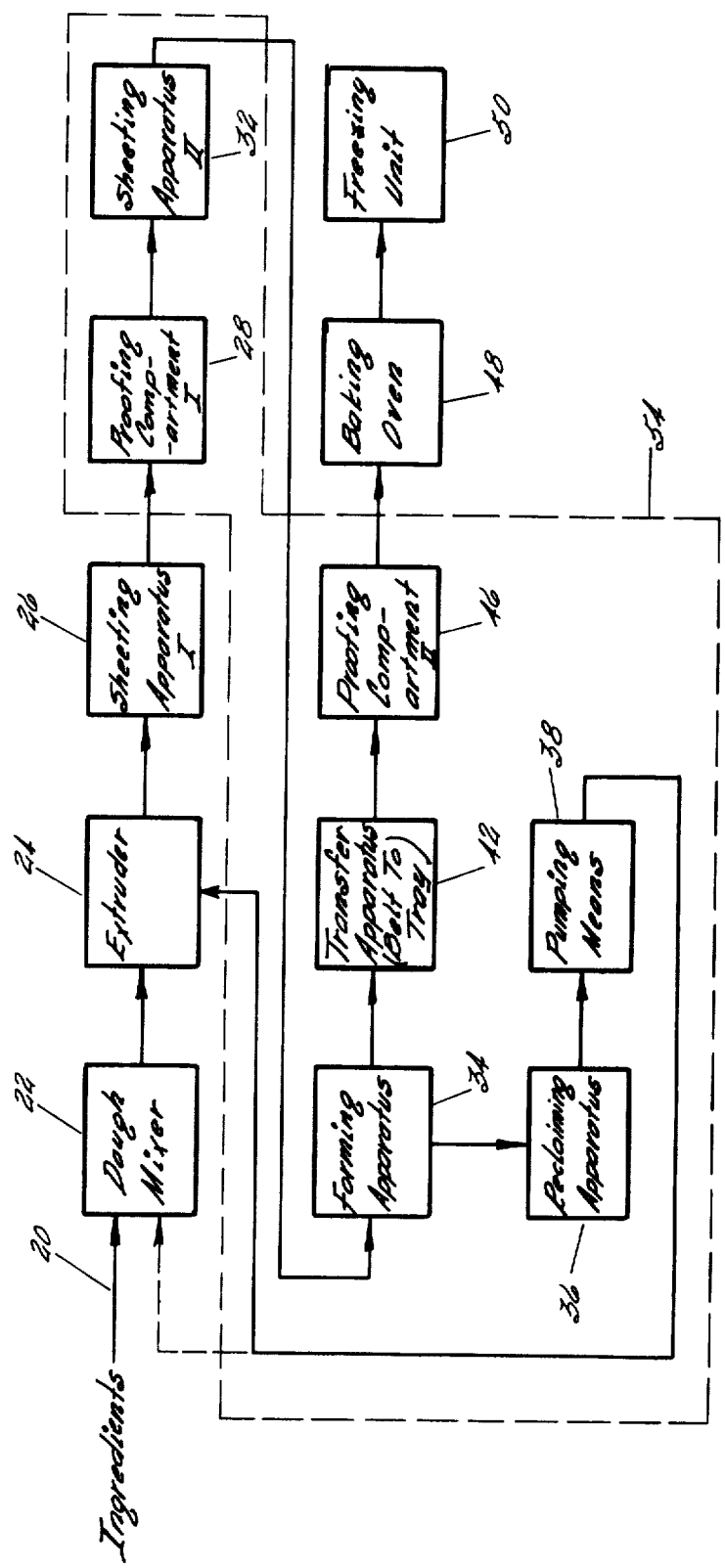
FIG. 1 is a block diagram illustrating a preferred embodiment of the apparatus for practicing the method of the present invention.

Referring to the block diagram of FIG. 1, the various steps of the method and apparatus adapted to practice the method, including possible alternatives in terms of apparatus, are shown. The ingredients for the dough, represented by input line 20, are supplied to a dough mixer 22. The dough mixer 22 may be a batch mixer, as known in the commercial baking field, for producing batches, for example ranging from 500 pounds per batch up to 900 pounds per batch. Alternatively, the dough mixer 22 may comprise other known dough mixers, such as for example, a continuous dough mixer wherein the ingredients 20 are continuously supplied as an input and the mixed dough is continuously produced as an output. Typical outputs could be expected in the range of 1500 pounds of mixed dough per hour up to 3000 pounds of mixed dough per hour.

One example of a useable receipe is as follows:
100 pounds commercial baking flour
6 pounds of fat shortening (commercial grade)
1.5 pounds of salt (commercial grade)
2.0 pounds of sugar (commercial grade)
1.5 pounds of baking powder
3.0 pounds of yeast
water required for 50% moisture.

The mixed dough is transferred to a means for extruding into a relatively thin continuous dough web, such as for example an extruder 24. The dough web is then sheeted to a preliminary width and thickness by apparatus generally referred as sheeting apparatus I and identified as 26.

Thereupon the dough web is carried into a proofing compartment I identified as 28. In the embodiment considered in detail hereafter, the proofing of the dough web is accomplished by stacking of an endless belt conveyor which transports the dough web for a predetermined time interval while concurrently permitting the dough web to rise.

After the first proofing step the raised dough web is further sheeted by additional sheeting apparatus generally referred to as sheeting apparatus II identified as 32. The apparatus 32 sheets the dough web until a predetermined width and thickness is obtained.

The sheeted dough of predetermined width and thickness is then formed into dough sections or dough shells by a forming apparatus 34. The forming apparatus 34 divides or cuts the dough web yielding the formed dough shells with the remaining portion of the dough web being scraps or trimmings.

The trimmings are separated from the forming apparatus, or dividing means, by a separating means which disassociates the trimmings from the dough shells. The means for accomplishing the above is referred to as reclaiming apparatus 36 which includes necessary conveyors and the like for transporting the trimmings to the beginning of the production line.

At the beginning of such production line, the individual dough pieces forming the trimmings are compacted into a dough mass and blended into the mixed dough. A pumping means 38 with appropriate outlets cooperates with the reclaiming apparatus 36 to blend the dough trimmings into at least one of the mixing means, e.g. the extruder 24. The preferred embodiment, as disclosed herein, is to blend the dough trimmings into the mixed dough just prior to the extruder 24.

Continuing with the dough shells, a transfer apparatus 42 transfers the dough shells from a conveyor, which functions to transport the dough web, to a tray carrying conveyor, which is adapted to carry the dough shells through a baking oven. The combination of an endless belt for the dough web and a tray carrying conveyor are a preferred embodiment of the novel apparatus for practicing the method of the invention.

The tray carrying conveyor with the dough shells is then transported through a second proofing compartment II identified as 46. In this manner, the tray conveying means continuously transports the dough shells for a preselected time interval while concurrently permitting the dough shells to rest.

The proofed dough shells then are transported through a baking means such as baking oven 48. The tray carrying conveyor moves continuously transporting the dough shells through a controlled heat environment until a controlled stage of baking is obtained.

The baked dough shells are normally dumped from the tray carrying conveyor after cooling. The dough shells may then be transported to a freezing unit 50. Alternatively, the dough shells could be used at once. If desired, the step of baking could be omitted.

The portion of the block diagram of FIG. 1 enclosed by dashed box 54 broadly includes the minimum compartment of one embodiment of the apparatus for practicing the present invention. The method of the present invention for forming dough products from a dough web comprise the steps of (1) proofing the dough web for a preselected time interval on a moving conveyor means; (2) sheeting the dough web to a predetermined width and thickness; (3) forming the dough web into dough products on the moving conveyor means; and (4) proofing the dough products for a preselected time interval.

Before proceeding with a detail explanation of the FIG. 2 to FIG. 11, inclusive, a short explanation of the utility of the invention is believed helpful. The preferred embodiment of a production line apparatus for forming the dough shells, such as pizza shells, on a continuous basis is shown. Such a production line using the apparatus and method disclosed herein is fairly long in overall length and comprises many segments of endless conveyor belts for transporting the dough web. The description of the preferred embodiment and accompanying drawings shows the pertinent components for the apparatus. For brevity, common sections of conveyors have been omitted. It is believed that a person skilled in the art will easily understand that intervening endless belt conveyors and sheeting apparatus can be included as needed.

The preferred embodiment described herein is for making pizza pie shells which are substantially circular in shape, have a diameter of approximately 10.5 inches and a thickness of about ⅛ inch.

Figure 2:
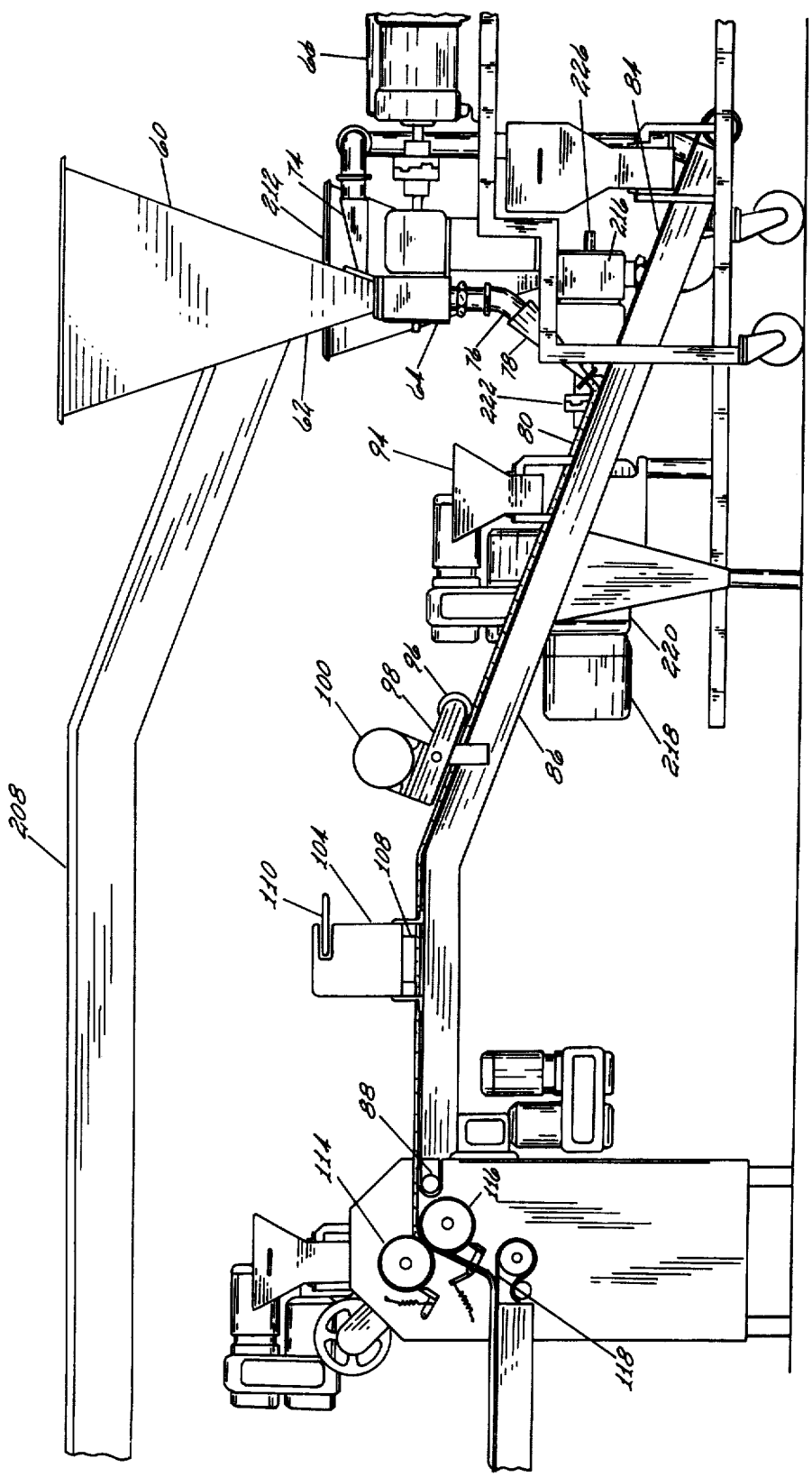
FIG. 2 is a side view of the apparatus illustrating the extruder, one stage of sheeting apparatus, part of the trimming reclamation conveyor system and other components associated wiith the means for blending reclaimed trimmings with mixed dough.
Figure 3:
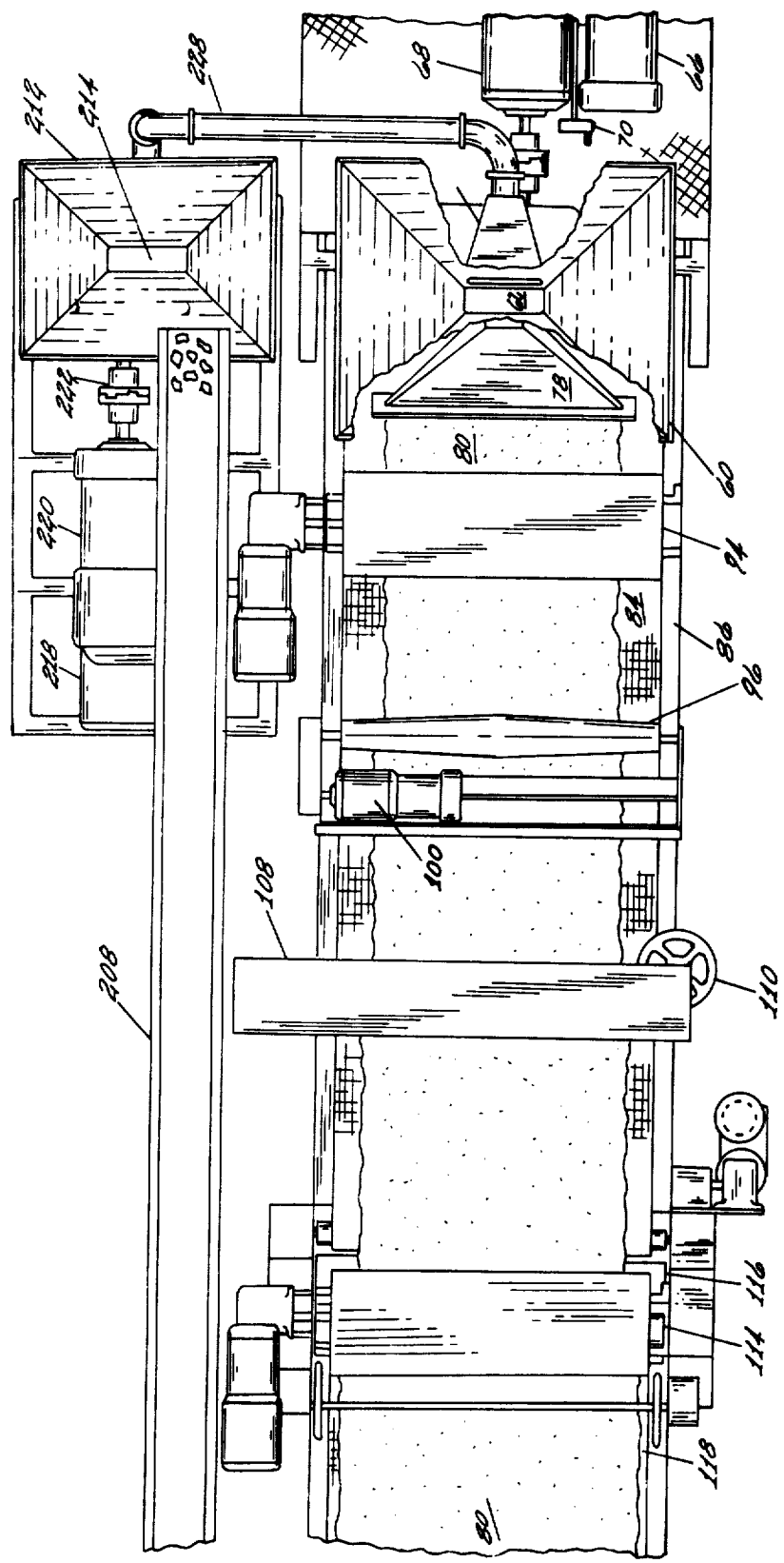
FIG. 3 is a top view of the apparatus of FIG. 2.

Referring now to FIGS. 2 and 3, mixed dough from a dough dough mixer is conveyed from a batch mixer (not shown) to an inverted pyramide shaped dough hopper 60. The hopper 60 has truncated end thereof 62 which functions as an outlet for directing the mixed dough into a dough pump 64 (FIG. 1). The pump 64 is driven by an electric motor 66 through a gear reduction unit 68. An adjusting wheel 70 permits adjustment of the pump 64 to control the quantity of dough pumped therethrough.

The truncated end 62 is joined to a metering extruder 74 which forms a ribbon of dough from a dough mass formed of dough trimming as well become apparent from the description.

The pump 64 blends the mixed dough, comprising mixed dough and dough trimmings, and urges the mixed dough through conduit 76. The conduit 76 delivers the dough to an extruder 78 which forms the dough into a relatively thin continuous dough web 80. In one embodiment, the dough was extruded into a dough web about 25 inches in width and about ⅛ inch in thickness.

An endless belt conveyor 84 supported on a frame 86 and supported by a driven pulley 88 and an idler pulley 90. The frame, driven pulley and idler pulley are common throughout and will not be referenced separately hereinafter except where believed necessary.

A flour duster 94 distributes a fine coating of flour on web 80. A compression roller 96, having a concave surface which is thicker at the center diameter thereof and which tapers to a smaller diameter at the end thereof, is pivotly mounted on a frame 98. A driving motor 100 operatively connected to the compression roller 96 rotates the roller clockwise at substantially the same speed as the dough web 80 is transported from right to left. The compression roller 96 overcomes the tendency of the dough web 80 to shrink after extrusion.

Thereafter, the dough web 80 is subject to transverse web rolling by means of a cross-roller apparatus, generally shown as 104, having a cross roller 108. The cross-roller 108 is moved transversely across dough web 80 as the web is transported by the conveyor 84. An adjusting wheel 110 permits regulating the pressure exerted on the dough web 80 by the cross roller 108.

The dough web 80 is then passed through a double roller sheeting apparatus 112 having sheeting rollers 114 and 116. The sheeted dough web 80 is then deposited on a moving endless conveyor, such as for example, conveyor 118. In this embodiment, the endless belt conveyor is formed of a plurality of aligned separate conveyors. Driving motors, gear reduction units and flour duster are used as necessary, some of which are depicted pictorially in FIGS. 2 and 3. These components and the mechanical connections therebetween will not be considered in detail since the operation thereof and the required mechanical cooperation is believed shown in the various Figures. The other components forming the elongated conveyor 208 illustrated in FIGS. 2 and 3 for processing dough trimming are to be discussed in detail relative to the reclamation apparatus.

Figure 4:
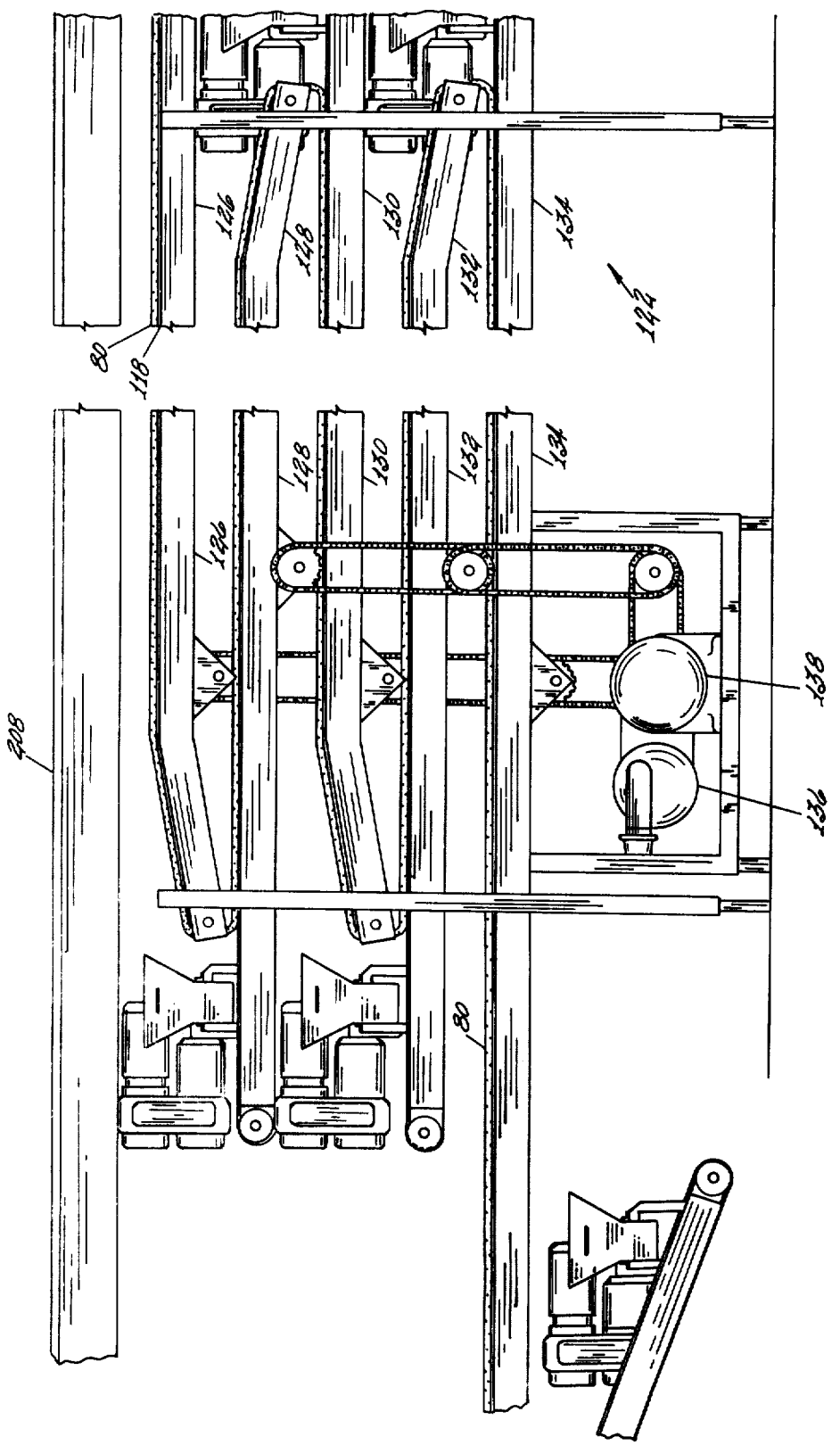
FIG. 4 is a side view of the first proofing compartment showing the stacking arrangement of the moving endless belt with the web of dough thereon, which compartment is located after the sheeting apparatus.

FIG. 4 shows a proofing means, generally designated as 122, located after the sheeting apparatus 112. Additional flour dusters and conveyor components may be used as required between the proofing means 122 and the sheeting apparatus 112. For purpose of explanation conveyor 118 is shown as the moving endless belt which transports the web 80.

The proofing means illustrated in FIGS. 4 and 5 comprises five stacked conveyors 126 through 134. Conveyor 126 is driven by belt 118. The outer surface of dough web 80 on conveyor 126 becomes the bottom surface of dough web 80 on conveyor 128. This alternating shifting of top to bottom of the web continues until conveyor 134 wherein the top surface of dough web 80 emerges from the proofing means 112. By selecting in combination, the number of stacked conveyor, the length thereof and web speed, the dough web 80 can continuously transported through the proofing stage for a predetermined time interval. If desired, the proofing compartment may be enclosed and the environment thereof, such as temperature, humidity, and the like, can be controlled such that the exact desired proofing characteristics of the dough web 80 may be obtained. In this embodiment, the proofing compartment is at ambient temperature, about 70° F, with the humidity about 20%. In FIG. 4, a single large motor 136 and a gear reduction unit 138 drive the stacking conveyors 128 through 134 as shown.

Figure 6:
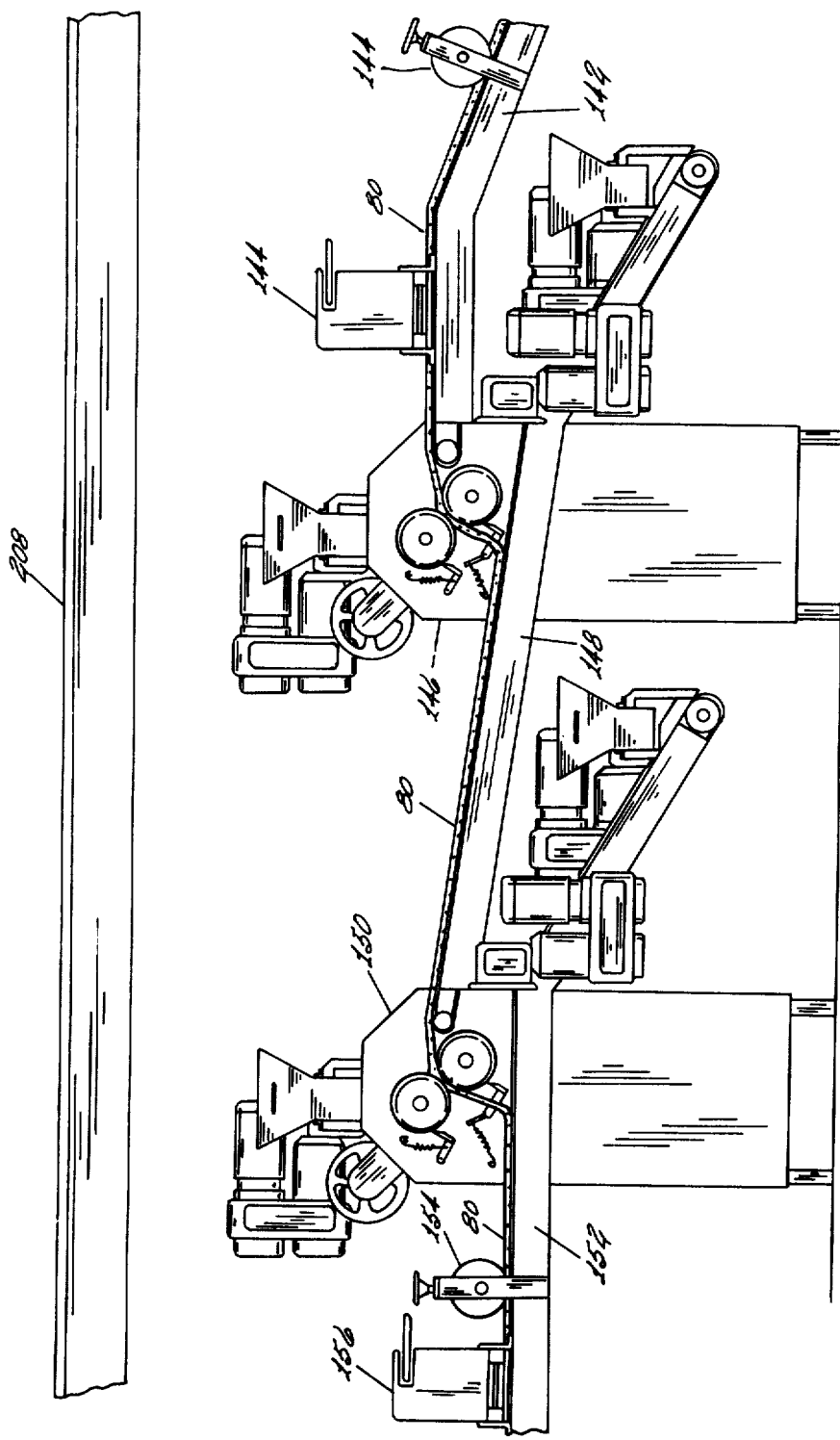
FIG. 6 is a side view of additional sheeting apparatus utilized to form the dough web to a uniform width and thickness.

After the dough web 80 is proofed, it is then sheeted and cross-rolled several times. FIG. 6 illustrated the dough web 80 transferring from conveyor 134 to an inclined conveyor 142. The width of the dough web 80 is maintained by a circular knife 144 which cuts off the edges of the dough web exceeding the desired width. Next the dough web 80 is cross-rolled by cross-rolling apparatus 144 and sheeted by double roller sheeting apparatus 146. The sheeted dough web 80 is transferred to another inclined conveyor 148 where the dough web 80 is further processed by a double roller sheeting apparatus 150. Thereafter, the sheeted dough web 80 is placed on a level conveyor 152 where the web is again cut to desired width by circular knife 154. The dough web 80 is cross-rolled again by cross-rolling apparatus 156. Additional sheeting, cutting and cross-rolling of the dough web may be performed as desired.

Figure 7:
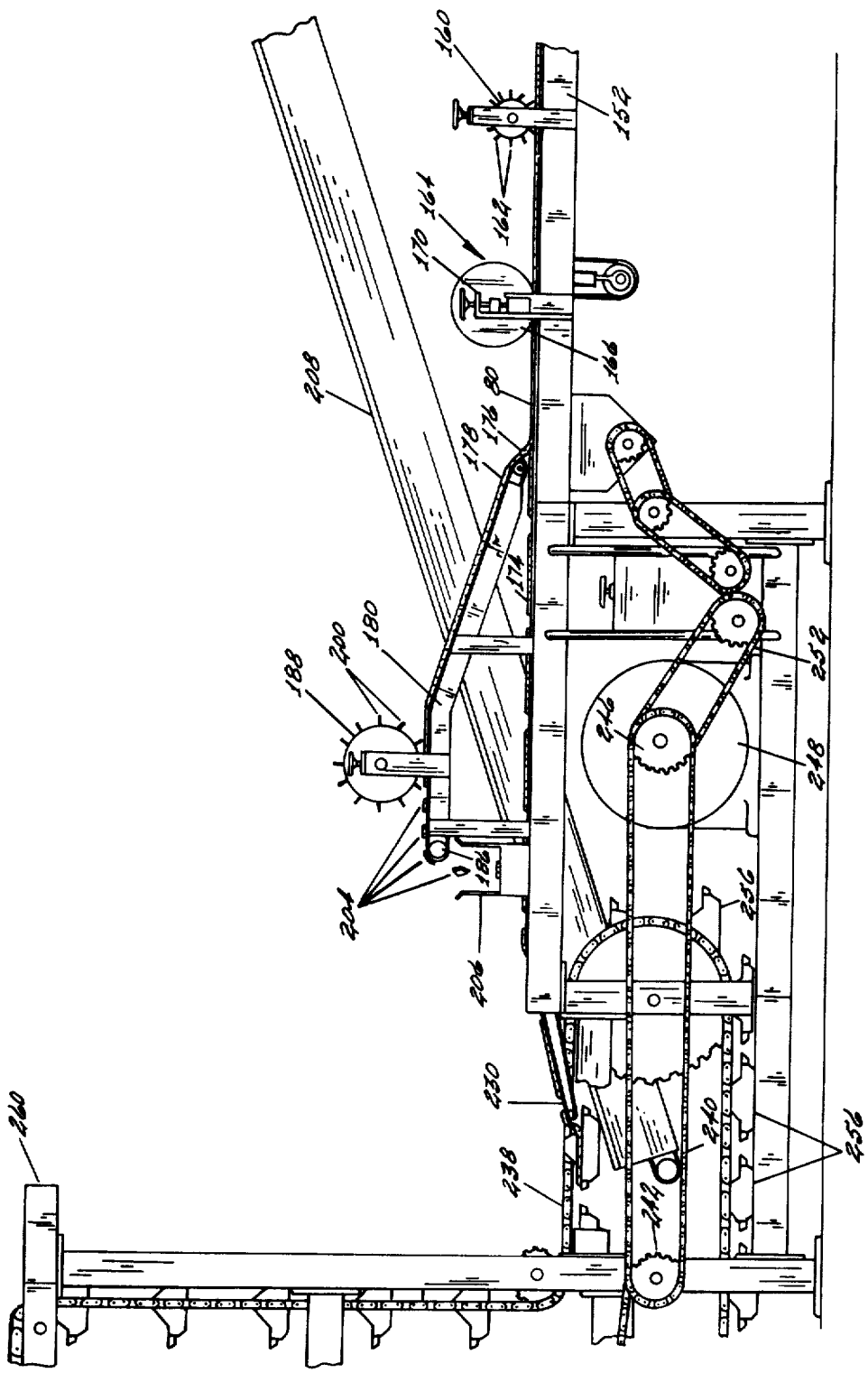
FIG. 7 is a side view of a rotary mounted forming apparatus, the apparatus for separating dough trimmings from the dough shells and the apparatus for transferring the formed dough shells from an endless belt conveyor to a tray carrying conveyor.
Figure 8:
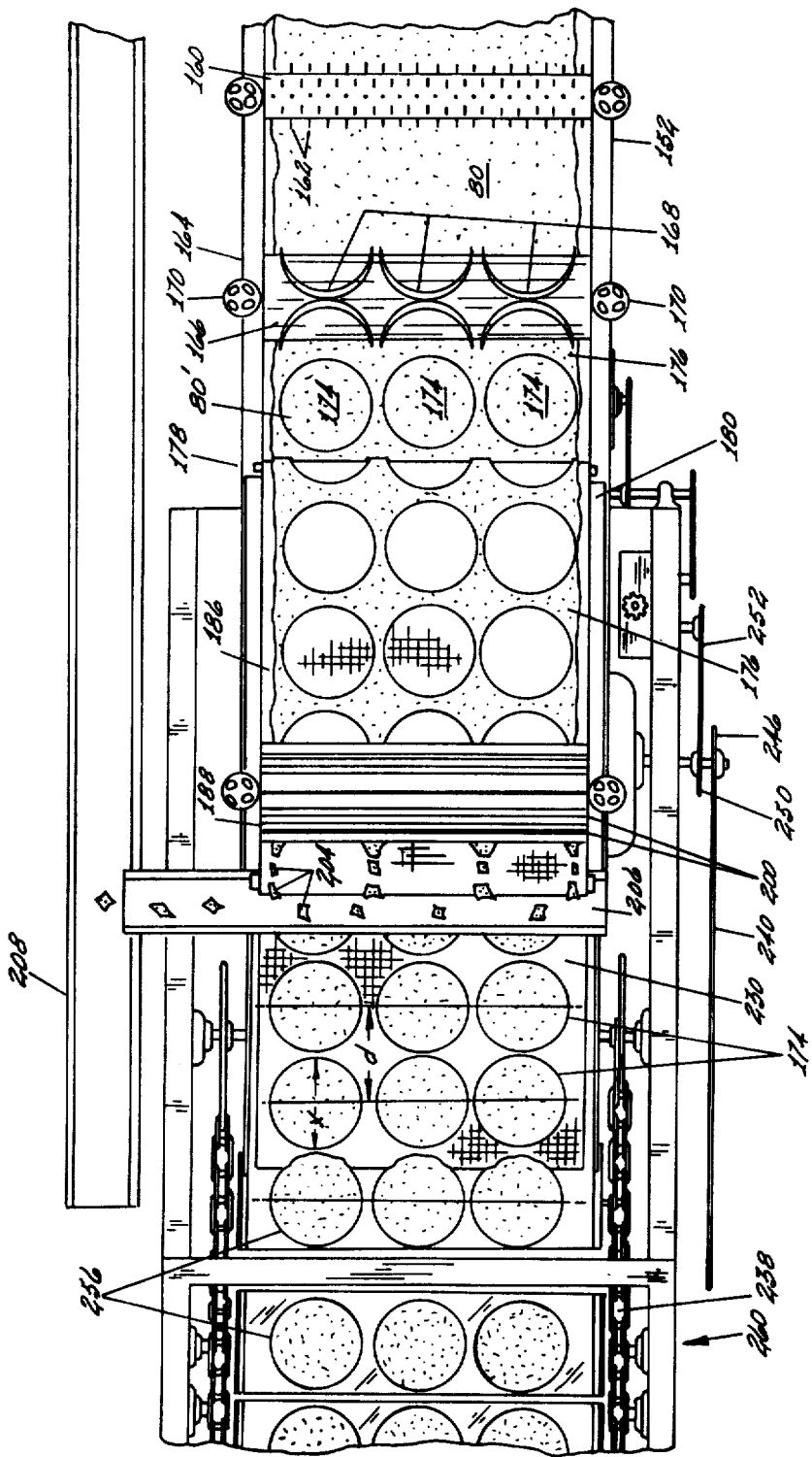
FIG. 8 is a top view of the apparatus of FIG. 7.

For purpose of explanation, the conveyor 152 of FIG. 6 will be deemed the conveyor transporting the dough web 80 in FIGS. 7 and 8. It is expected that an intermediate conveyor could be required between the sheeting of the dough web 80 and components of FIGS. 7 and 8.

A rotary mounting perforating roll 160 is positioned transverse to the direction of movement of dough web 80 and spaced from the dough web 80 to permit elongated members or spikes 162 to puncture the dough web 80 forming a plurality of apertures therein.

The perforated dough web 80 is then transported to a dividing means or forming means, generally designated as 164, where the dough web 80 is divided or cut into dough shells or dough sections having a predetermined geometrical dimension. The dividing means 164 comprises a rotary cutter 166 having forming units 168 on the outer periphery of the cutter. The cutter 166 is mounted transversly to the dough web 80 on the conveyor 152.

In the preferred embodiment, the dough web is sheeted to about 33 inches in width and about ¼ inch in thicknes. Circular dough shells are formed therein by the rotary cutter 166 severing the dough web 80. The forming units 168 are elliptical in shape such that rotation of the cutter 166 is clockwise and forms a substantially circular dough shell.

In particular, the rotary cutter 166 has three forming units 166 aligned thereacross. The edges of the forming units 168 pierce and sever the dough web. Rotation of the cutter 166 is accomplished by a sprocket and chain drive to keep the rotary cutter 166 in positive timing with the pans./ Height adjusting members 170 permit the height of the rotary cutter 166 to be adjusted such that a clean and complete cut can be made through the dough web 80.

The cut dough web 80, just as it leaves the rotary cutter 166, is shown as 80'. Circular dough shells or dough sections 174 and the dough trimmings or scrapes 176 are still associated.

A separating means, generally designated at 178, is positioned adjacent the conveyor 152 and after the rotary cutter 170. The separating means 178 includes an inclined separating conveyor 180 which is positioned at an acute angle relative to the conveyor 152. The inclined conveyor 180 functions to removeably disassociate the dough trimming 178, which is in the form of a perforated web from dough shells 174. The dough trimmings 178 are transported by an endless belt 186 of conveyor 180 to a second rotary cutter 188. The cutter 188 has a plurality of of parallel knife-like blades 200 extending across the outer periphery thereof. The rotary cutter 188 is driven, by the endless belt 186 of conveyor 178, in a clockwise direction. As the endless belt 186 transport the dough trimmings 176 into cuttable contact with the knife-like edges 200, the trimmings are cut into smaller dough pieces 204.

The dough trimming reclamation system will now be considered in detail.

A trough shaped conveyor 206 is positioned above the dough shells 174 and conveyor 152 but below conveyor 180. Conveyor 152 is adapted to receive and transport the smaller dough pieces away from the end of conveyor 180. In the preferred embodiment as illustrated in FIG. 8, the trough shaped conveyor 206 transport the cut dough pieces 204 across the moving dough shells 174 to an inclined trough shaped conveyor 208. The conveyor 208 is positioned to receive and transport the cut dough pieces 204 from the short conveyor 206 back to the beginning of the line.

Trough shaped conveyor 208 is also shown in FIGS. 2 through 6. The remaining portion of the dough trimming reclamation system, illustrated in FIGS. 2 and 3, will now be considered in detail.

The trough shaped conveyor 208 in FIG. 2 is essentially a scrap feedback system. When the dough web 80 is divided into dough shells 174 and dough trimming 176 (FIGS. 7 and 8), approximately 30% of the dough web 80 becomes scraps. The reclamation system provides a heretofore unknown method and means to utilize, on a continuous controlled basis, the blending of dough scraps back into the mixed dough. The prepared embodiment blends the dough just prior to the extruder 78.

Conveyor 208 deposits the cut dough piece 204 (FIG. 7) into an inverted pyramid shaped dough hopper 212 having an opening 214 therein. A dough pump 216 is operatively connected to hopper 212 such that the opening 214 functions as like inlet to pump 216. The pump 216 is driven by a separate motor 218 through a gear reduction unit 220 which is connected via shaft 222 to the pump 216. The pump 216 compresses the dough pieces 204 into a dough mass. As the dough pieces 204 are compressed, gases, which have been entrapped in the proofed dough, are driven out of the dough. Thus, the pump 216 has a vent 226 which permits the gases to be released.

A dough carrying conduit 228 is operatively connected between the pump 216 and the metering extruder 74. The pump 216 urges the dough mass through conduit 228 to the metering extruder 74. Metering extruder 74 forms the dough mass into a ribbon of dough which is delivered through truncated end 62 to the pump 64. Pump 64 blends the mixed dough and ribbon of dough formed of dough trimmings into a uniform mixed dough which is ultimately formed into the dough web 80 by the extruder 78.

Metering extruder 74 forms a ribbon of dough which is forced into the mixed dough. This method prevents the dough mass, formed of dough trimmings, from cavitating, that is, from separating into a distinct dough mass which separates from the mixed dough from the batch mixer. Such separation is common in the prior art apparatus when dough trimmings are dumped into the mixed dough.

The metering extruder 74 cooperates with hopper 60 such that the mixed dough supplied to the extruder 78 has substantially the same proportion of dough trimming at all times yielding a dough web 80 having a controllable or known proportion of dough scraps therein.

The description will now refer to FIGS. 7 and 8 and continue with the processing of dough shells 174. The conveyor 152 transports the dough shells 174 by means of an endless belt 230. Belt 230 is driven at a selected linear speed in the predetermined direction of right to left (as shown) and away from inclined conveyor 178.

The physical relationship between the dough shells 174 and the endless belt 230 becomes important as the dough shells 174 reach the end of conveyor 152.

As shown in FIG. 8, the dough shell 174 are aligned in a row across the width of the belt 230. The center line of each row is spaced a known and predetermined distance $d$ from each other. The predetermined distance $d$ must be at least equal to the diameter $x$ of each dough shell 174 measured in a direction transverse to the width of belt 230.

A tray carrying conveyor 238 is driven at the same predetermined speed as the belt 230 by chain 240 which is operatively connected to sprockets 242 and 244. The tray carrying conveyor 238 is positioned to receive and transport the dough shells 174 as the same leave and end of belt 230. Chain 240 is driven by a sprocket 246 which in turn is driven by motor 248. Also, the motor 248, through a driven sprocket 250 drives a chain 252 which in turn drives the conveyor 152 as shown. In this manner, the tray carrying conveyor 238, once indexed to belt 230, is synchronized to operate at the same speed and in the same predetermined direction as the belt 230.

The tray carrying conveyor 238 has a plurality of individual tray pans 256 pivotedly mounted thereon as shown. Each tray has a width at least equal to the width of the endless belt 230 and a length (in the direction transverse to tray width) at least equal to the dimension of the dough shells 174.

Figure 12:
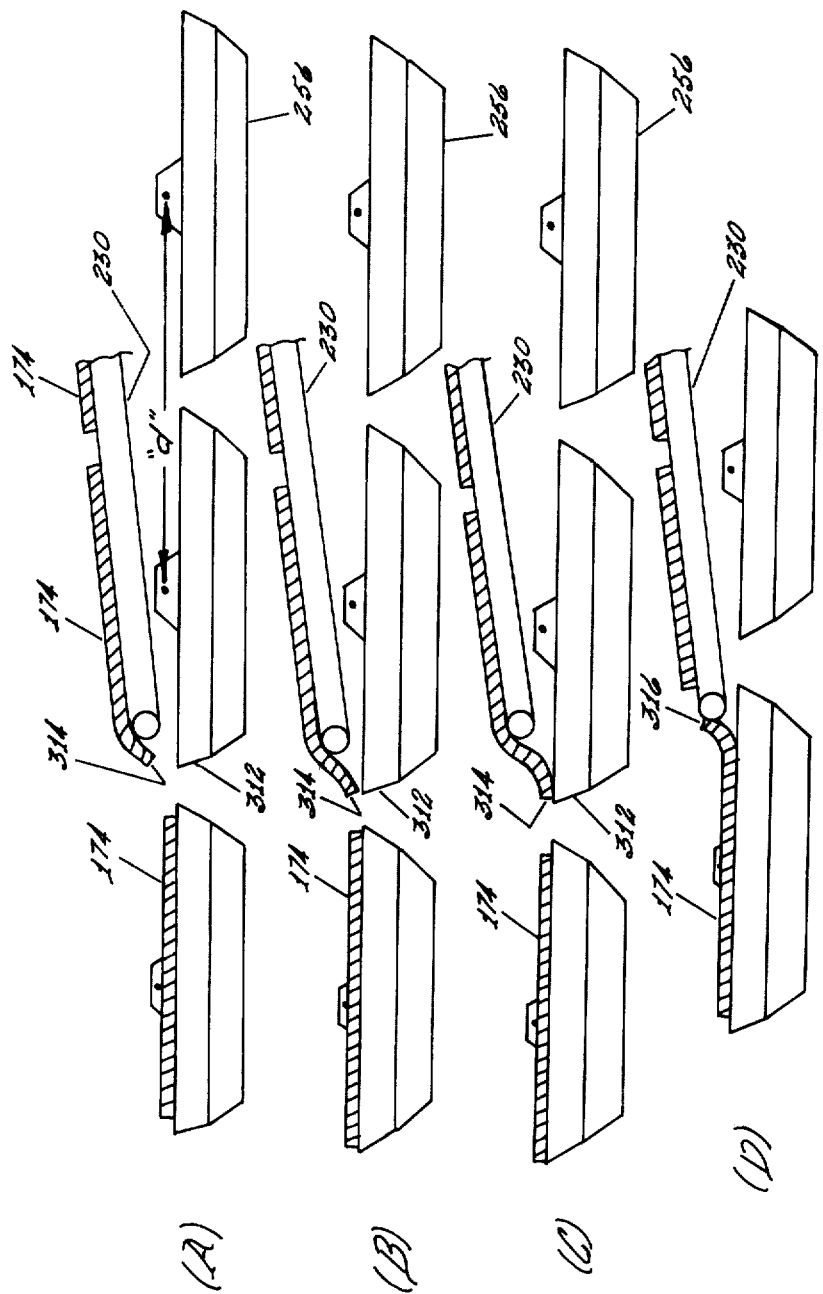
FIG. 12 is a diagrammatic representation of the indexing of the transfer apparatus illustrated in FIG. 7.

In this embodiment, the tray length is at least equal to $x$, the diameter of the dough shells 174. Each tray 256 is separated by the predetermined distance $d$ such that each tray is indexed to the end of belt 230 just as the dough shells 174 are being dispersed. FIG. 12, which will be disussed hereinafter, illustrates diagrammatically, the critical steps of making the transfer of dough shells.

Figure 9:
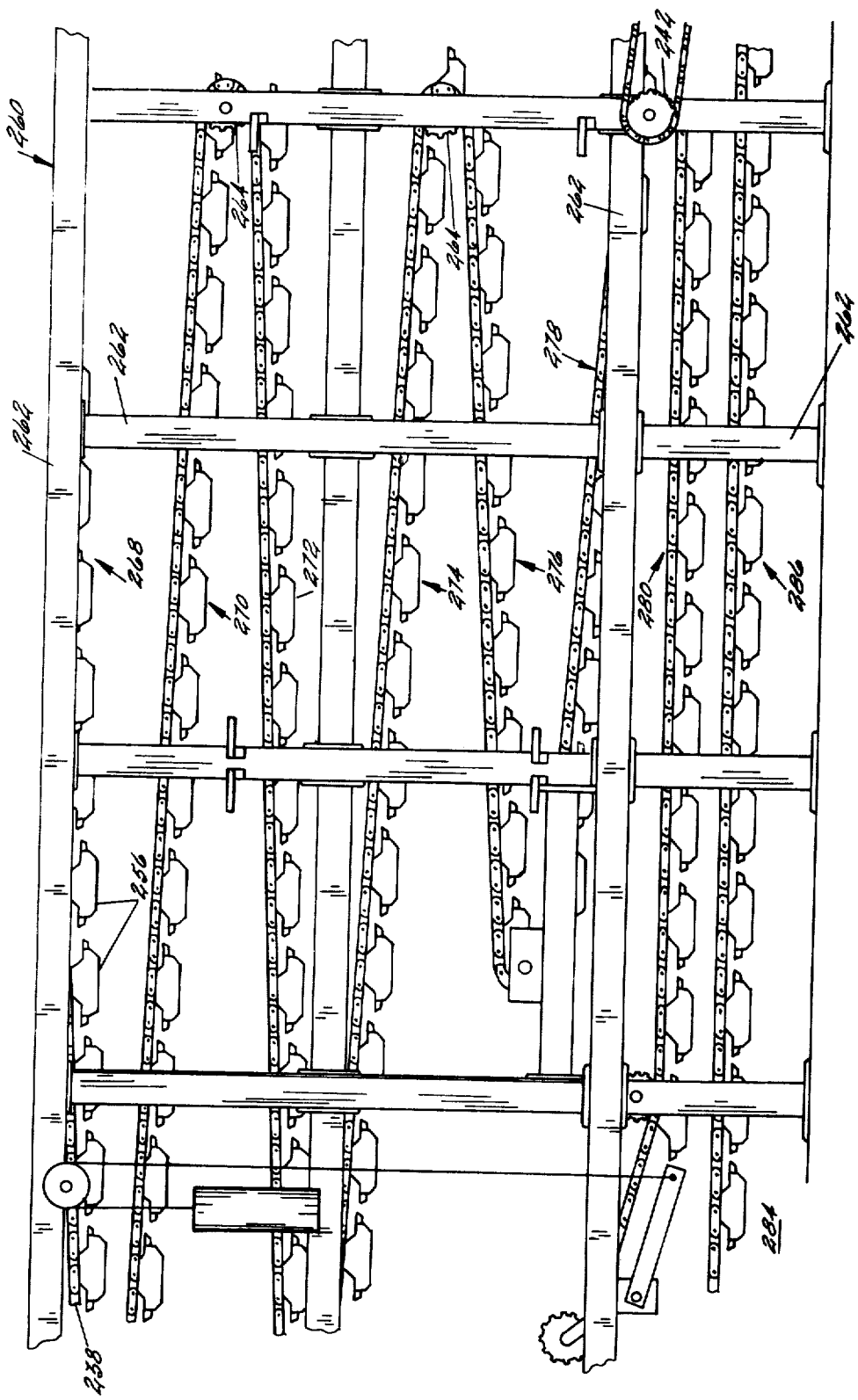
FIG. 9 is a side view of the second proofing compartment illustrating the stacking arrangment of the continuously moving tray conveyor.

FIG. 8 and FIG. 9 together depict the second proofing means generally designated as 260. A frame housing 262 include a plurality of idler sprockets 264 arranged therein to form a stacked tray conveyor. In housing 262, the tray conveyor is stacked into seven levels; namely levels referred to as 268 through 280.

In this manner, the tray carrying conveyor 238 is continuously moving but permits the dough shells 174 carried therein to be proofed or rested for a predetermined time interval. The time interval can be controlled by speed, number of stacking levels and length of each level.

If desired, the housing 262 may be enclosed by side 284 and a top and bottom (not shown) to control temperature, humidity and the like.

The bottom level 286 is the return portion of the conveyor 238 which brings the empty pans 256 into position as shown in FIG. 7.

In this embodiment, tray conveyors 238, after the proofing means 260 of FIG. 9, transports the proofed dough shells 174 to a baking oven 290. This is shown in both FIGS. 10 and 11. Tray pans 256 leave oven 290 and are carried by conveyor 238 through a cooling housing 292. The housing 292 has at least two levels, top level 294 and bottom level 296, through which the baked dough shells 174 are transported. Such apparatus enabled the dough shells to slightly cool before being dumped from the trays.

At the bottom level 296, the trays 256 are tilted and dumped. The tiling apparatus includes driven chain 298, having a plurality of rod members 300 extending outwardly therefrom. The chain 298 is spaced from and parallel to the trays 256. A driven sprocket 302 permits the rods 300 to be urged into engagement with tray 256 located thereunder carrying the tray to be tilted about its pivot point dumping off the dough shells 174. An air jet 304 operatively connected to a source of positive air pressure (not shown) via piping 306 provides a blast of air to push the dough shells off of the tilted pans 256. A cam shaped member 308 driven by conveyor 238 is used to activate the air source in a controlled sequence to provide the burst of positive air pressure through air Jet 304 at the proper time.

Figure 10:
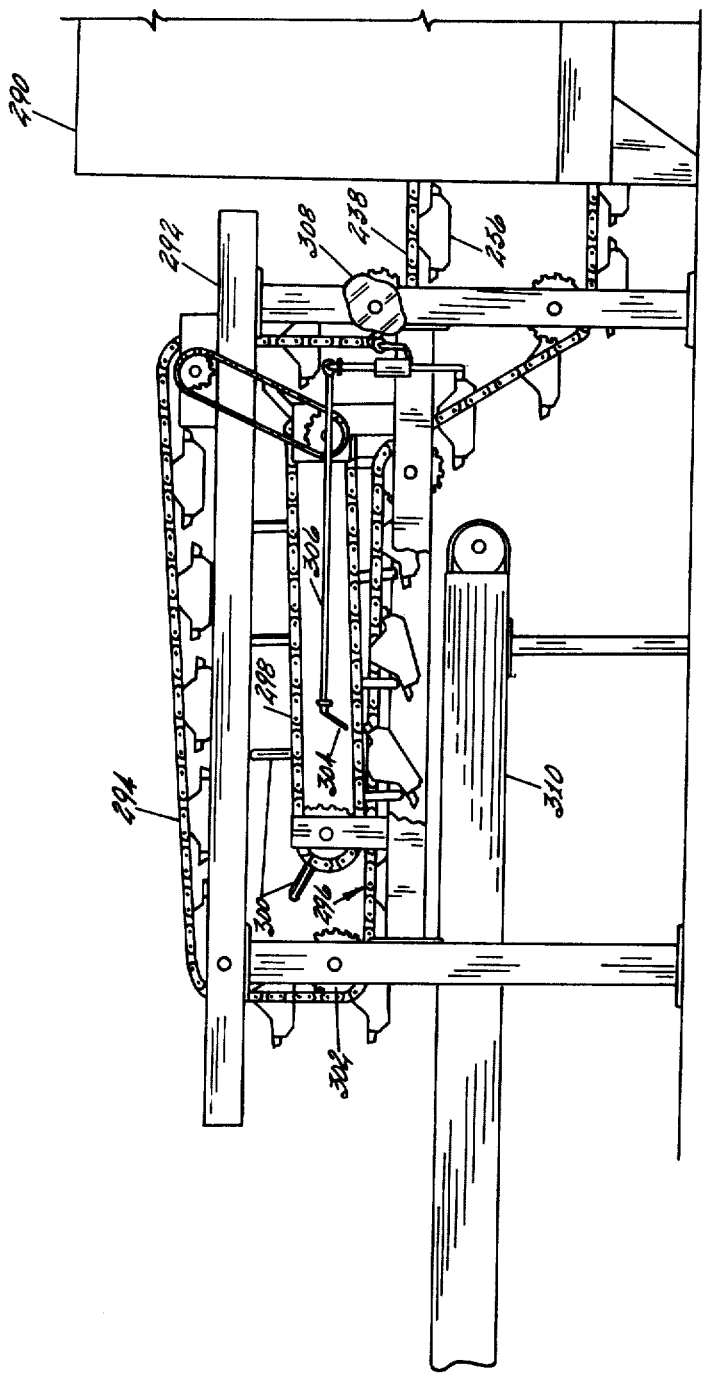
FIG. 10 is a side view of the tray tilting apparatus for transferring baked dough shell onto an endless conveyor.
Figure 11:
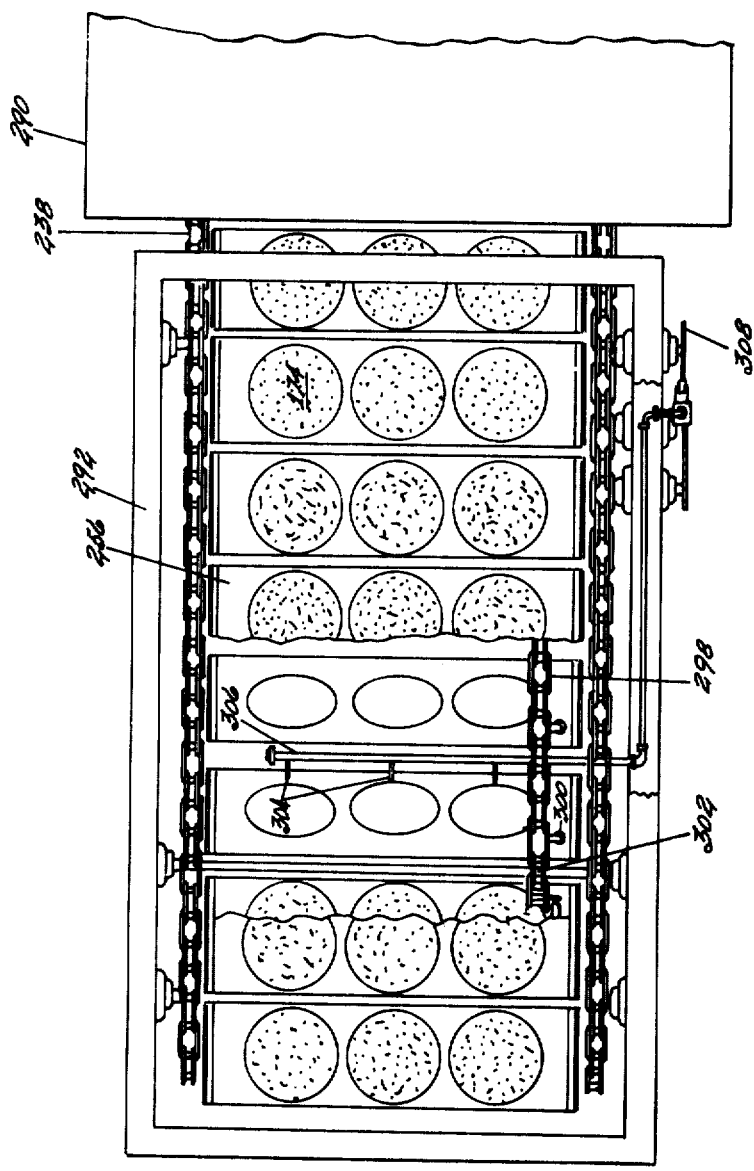
FIG. 11 is a top view of the apparatus of FIG. 10.

A level conveyor 310, FIG. 10, is positioned below the level 296 of conveyor 238 to receive and transport the baked dough shells from the cooling housing 292.

FIG. 12 shows, in greater detail, the indexing required between the endless belt conveyor 230 and trays 256. The tray carrying conveyor is positioned such that the tray pan 256 intersects with the discharge end of the endless belt conveyor 230 at an acute angle. In this embodiment, the acute is less than 45° with an angle about 30° being preferable.

Step A of FIG. 12 depicts that the leading edge 312 of pan 256 is transported across the point of intersection at about the same time that the leading edge 314 of dough shell 174 is dischargd from the end of belt 230.

Step B of FIG. 12 shows that the leading edge 314 of dough shell 174 is deflected by leading edge 312 on tray pan 256 through the acute angle.

Step C of FIG. 12 shows that the leading edge 314 of dough shell 174 is positioned on leading edge 312 of pan 256 and is transported away from belt 230 at the same rate as the dough shell 174 is dispersed from belt 230. This sequence occurs simultaneously for all three aligned dough shell in each row.

Step D of FIG. 12 shows the trailing edge 316 of dough shell 174 being dropped onto pan 256.

Since the trays 256 are indexed to belt 230, the dough shells are then transferred in proper sequence and alignment to the trays.

It is contemplated that the dough shells 174 could be subdivided into smaller components, and such components could also be easily transferred from the belt to trays using this transferring apparatus. The geometrical relationship and position of the dough shells 174 will be substantially maintained during the transfer operation so long as the proper synchronizing is maintained with the tray pans.

As the dough web 80 is processed through each processing stage, it has been determined that use of separate conveying means permits higher linear belt speeds to be used as the various steps occur. Generally, it has been found that the linear belt speed can be doubled at the end of the panning conveyor chain compared to the belt speed at the dough web extruder. The linear belt speeds would be appropriately increased between these processing stations.

What is claimed is:

1. A method for forming dough into dough sections comprising the steps of
    sheeting said dough into a moving continuous dough web:
    proofing said dough web for a predetermined proofing interval while concurrently transporting the same;
    sheeting said dough web to a predetermined thickness and width;
    cutting said dough web of predetermined thickness and width to form dough sections therefore with the remaining portion of said cut dough web being trimmings;
    separating said dough sections from said trimmings;
    blending said trimmings into said dough prior to the sheeting thereof; and
    proofing said separated dough sections for a predetermined resting interval while concurrently transporting the same.

2. The method of claim 1 further comprising the steps of
    transferring said separate dough sections onto a moving conveyor comprising a baking pan; and
    baking said dough shells in a controlled heated environment until a controlled stage of baking is obtained.

3. The method of claim 1 further comprising the step of
    mixing said dough from a continuous input of dough ingredients to continuously supply dough for sheeting into a continuous dough web.

4. The method of claim 1 further comprising the step of
    mixing said dough from an intermittent input of dough ingredients to supply batches of dough for sheeting into a continuous dough web.

5. The method of claim 4 wherein said step of blending includes the steps of
    chopping said dough trimmings into smaller dough pieces;
    transporting said dough pieces to a location wherein the same can be controllably blended with dough.

6. The method of claim 5 further comprising the steps of
    compressing said transported dough sections into a dough mass; and
    controllably metering the dough mass into said dough wherein the sheeted dough web if formed of predetermined portions of dough trimmings.

7. The method of claim 6 further comprises the step of perforating said dough web of predetermined thickness and width for forming a plurality of apertures therein.

8. A method for forming dough products from a continuous dough web comprising the steps of
    proofing said dough web for a preselected time interval on a moving conveying means;
    sheeting the dough web to a predetermined width and thickness on said moving conveying means;
    forming said dough web into dough products and dough trimmings on said moving conveying means;
    separating said dough trimmings from said dough products; and
    proofing said dough products for a preselected time interval.

* * * * *